(12) United States Patent
Landsiedel et al.

(10) Patent No.: US 12,541,923 B2
(45) Date of Patent: Feb. 3, 2026

(54) DIGITAL TWIN MANAGEMENT AND INTERACTION

(71) Applicant: Google LLC, Mountain View, CA (US)

(72) Inventors: Bryan Landsiedel, San Jose, CA (US); Topraj Gurung, Sunnyvale, CA (US); Tianyu Liang, Santa Clara, CA (US); Sergey Milenkiy, Burlingame, CA (US); Peter Kammer, San Mateo, CA (US); Paul Byrne, Atascadero, CA (US); Lance Engle, Mountain View, CA (US); James Beattie, Sunnyvale, CA (US); Ehsan Barekati, Pleasanton, CA (US); David Bond, Los Angeles, CA (US); David Black, Mountain View, CA (US); Bryan Woods, Santa Clara, CA (US); Bret Stastny, Port Angeles, WA (US); Benjamin Molyneaux, Mountain View, CA (US); Jeremy Swanson, San Francisco, CA (US); Timothy Jones, Danville, CA (US)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 18/074,860

(22) Filed: Dec. 5, 2022

(65) Prior Publication Data
US 2024/0185525 A1 Jun. 6, 2024

(51) Int. Cl.
*G06T 17/20* (2006.01)
*G06F 9/50* (2006.01)

(52) U.S. Cl.
CPC .............. *G06T 17/20* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 10,460,516 B1 * | 10/2019 | Eastham | G06T 17/20 |
| 10,672,189 B2 | 6/2020 | Makinen et al. | |
| 2015/0262420 A1 * | 9/2015 | Arun | G06F 3/1446 |
| | | | 345/420 |
| 2016/0093092 A1 * | 3/2016 | Fay | G06T 15/08 |
| | | | 345/419 |
| 2020/0082198 A1 * | 3/2020 | Yao | G06V 20/41 |

(Continued)

OTHER PUBLICATIONS

Extended European Search Report for European Patent Application No. 23174437.6 dated Oct. 10, 2023. 10 pages.

(Continued)

*Primary Examiner* — Jason A Pringle-Parker
(74) *Attorney, Agent, or Firm* — Lerner David LLP

(57) ABSTRACT

A system and method of managing a model, such as a digital twin. The method may involve receiving three-dimensional model data representative of a setting, converting the three-dimensional model data into a simplified model using a parallel processing pipeline architecture, rendering the simplified model using a three-dimensional model rendering platform, converting a view of the rendered model from a specific position at a specific angle into a streamable format, and transmitting the streamable format of the view of the rendered model to an end-user terminal over a network connection.

19 Claims, 6 Drawing Sheets

(56) References Cited

U.S. PATENT DOCUMENTS

2020/0310884 A1* 10/2020 Villalobos ............. G06F 16/909
2020/0348941 A1* 11/2020 van Adelsberg ....... G06N 20/00

OTHER PUBLICATIONS

Pfeiffer et al. Modeling Capabilities of Digital Twin Platforms—Old Wine in New Bottles? The Journal of Object Technology, vol. 21, No. 3, Jul. 1, 2022 (Jul. 1, 2022), 14 pages, Retrieved from the Internet: <https://awortmann.github.io/downloads/paper/Modeling_Capabilities_of_Digital_Twin_Platforms_-_Old_Wine_in_New_Bottles. pdf>.

Hofmann et al. A brief introduction to deploy Amazon Web Services for online discrete-event simulation. Procedia Computer Science, vol. 200, Mar. 10, 2022 (Mar. 10, 2022), pp. 386-393, XP093087300, Amsterdam, NL, Retrieved from the Internet: <https://text2fa.ir/wp-content/uploads/Text2fa.ir-A-brief-introduction-to-deploy.pdf>.

AWS IoT TwinMaker User Guide. Oct. 16, 2022 (Oct. 16, 2022), 106 pages. Retrieved from the Internet: <https://web.archive.org/web/2022101620 4106if_/http://docs.aws.amazon.com/pdfs/iot-twinmaker/latest/guide/twinmaker-guide.pdf>.

Amazon Kinesis Video Streams Developer Guide. Oct. 16, 2022 (Oct. 16, 2022), 344 pages. Retrieved from the Internet: <https://web.archive.org/web/20221016202609if_/http://docs.aws.amazon.com/pdfs/kinesisvideostreams/latest/dg/kinesisvideo-dg.pdf>.

* cited by examiner

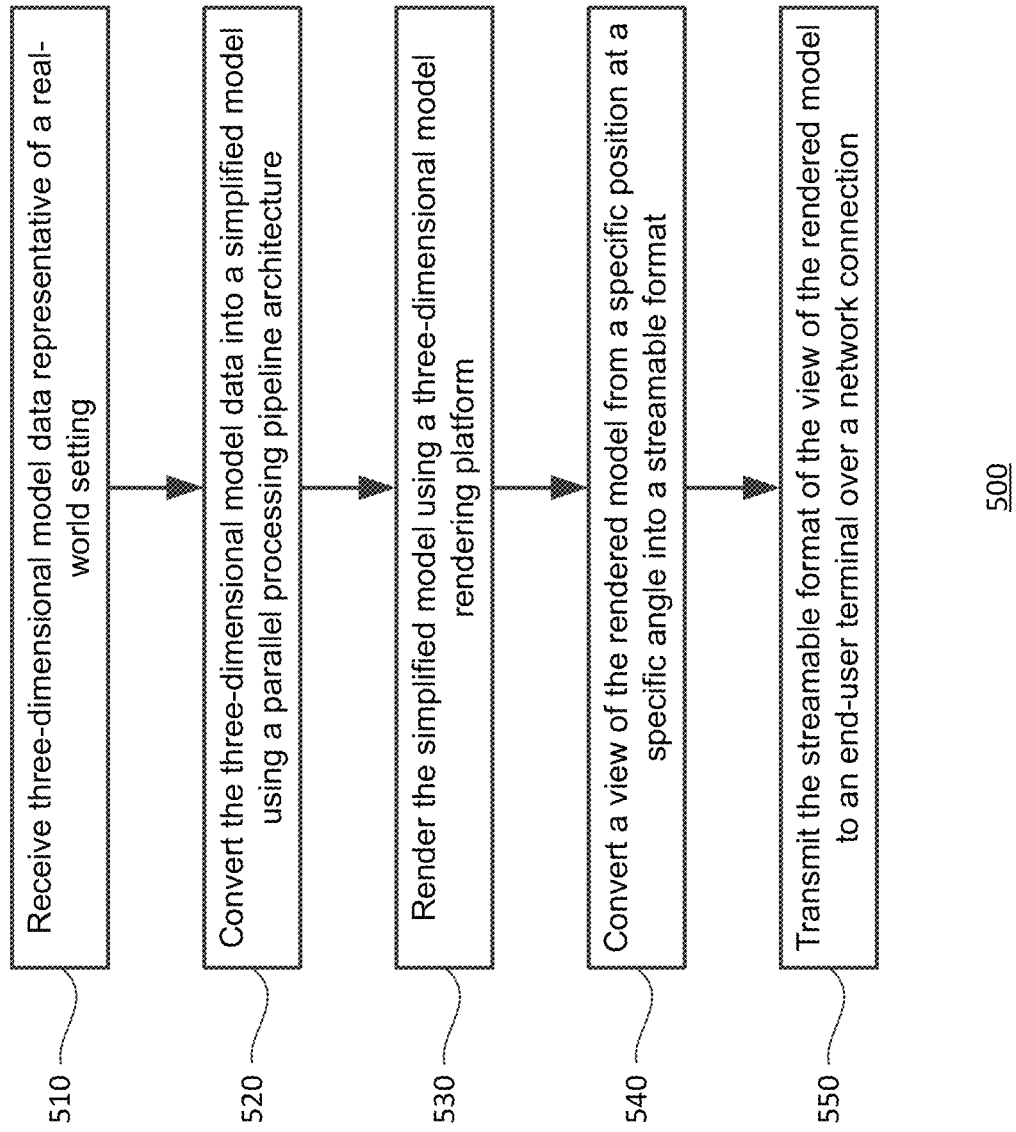

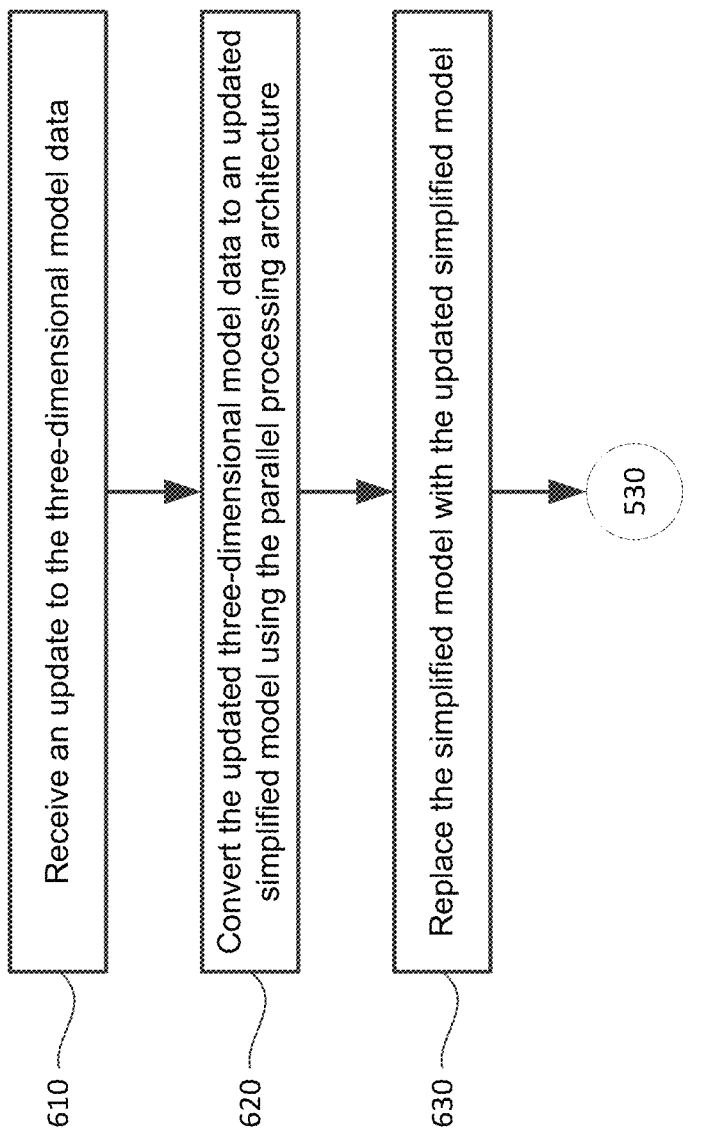

DIGITAL TWIN MANAGEMENT AND INTERACTION

BACKGROUND

A digital twin is a three-dimensional (3D) virtual model simulating the behaviors and properties of a physical object or space within a virtual environment. In this regard, a digital twin includes a virtual model of a physical object or space within the virtual environment. The physical object may be an object currently existing in the real world, such as a building that has already been constructed, or may be a theoretical object such as a building that has not yet been constructed. The virtual environment may represent a real-world environment, and may be simulated according to real-time data representative of the real-world environment. In some instances, the real-time data may be collected from an actual or planned location of the physical object or space. Digital twins are useful for virtually observing interactions between the physical object or space and its environment. Such observations may be for any number of purposes, including but not limited to prototyping, testing, and presentation.

Many digital twins represent large and highly detailed objects and environments, such as data center facilities and the objects in those facilities such as power bus elements, power switches and controls, electrical taps, servers, storage racks, ceilings, walls and so on. The models required to accurately represent these vast and detailed objects and their real-world environments virtually is so large as to make traditional computing solutions inadequate.

For example, standard three-dimensional architectural and mechanical models are typically loaded and viewed using local workstations, such as consumer-grade computing devices such as laptops and tablets. However, the relative size and complexity of large digital twins compared to standard three-dimensional architectural and mechanical models requires more powerful processors, and makes the use of local workstations to visualize the models impractical or even infeasible.

For further example, updating the digital twin to reflect a change in the corresponding object or its properties may be prohibitively time consuming. In this regard, any change made to the model may require the model to be resent to the local workstation and re-rendered by the local workstation. For large digital twins, resending and re-rendering can take anywhere between several hours to several days. As such, it is difficult to know whether the virtual model is outdated or whether the virtual model is no longer representative of the corresponding object and environment.

BRIEF SUMMARY

The present disclosure provides a system for interacting with large digital twins that addresses the aforesaid challenges by implementing 3D graphics processing techniques within a distributed computing environment. The system also provides for a practical and intuitive user experience of the digital twin.

In one aspect of the present disclosure, a system includes: one or more computing devices; and memory storing instructions that, when executed, cause the one or more computing devices to perform the operations of: receiving input data for constructing a three-dimensional model; dividing the input data into a plurality of workloads; providing the plurality of workloads to a parallel processing architecture of a distributed computing environment; receiving the processed workloads from the parallel processing architecture; combining the processed workloads into the three-dimensional model; and storing the three-dimensional model in the distributed computing environment.

In some examples, the input data may include metadata, and at least some of the metadata may be preserved in the three-dimensional model.

In some examples, the input data may include an indication of a model attribute, and dividing the input data into a plurality of workloads may be based on the model attribute.

In some examples, dividing the input data into a plurality of workloads may include: dividing a physical object or environment represented by the input data into a plurality of spatial blocks, each spatial block corresponding to a volume of space of the physical object or environment; sorting the input data among the plurality of spatial blocks; and assigning the plurality of spatial blocks to the plurality of workloads.

In some examples, dividing the input data into a plurality of workloads may include: dividing a physical object or environment represented by the input data into a plurality of categories, each category corresponding to a different feature of the physical object or environment; sorting the input data among the plurality of categories; and assigning the plurality of spatial blocks to the plurality of workloads.

In some examples, the parallel processing architecture may be configured to convert the input data to a simplified format for construction of the three-dimensional model, wherein the simplified format may be selected from a plurality of different degrees of simplification, and the instructions may further cause the one or more computing devices to perform the operation of: instructing the parallel processing architecture to simplify the input data according to a specified degree of simplification.

In some examples, the instructions may further cause the one or more computing devices to perform the operation of: determining the specified degree of simplification based on at least one of: a model attribute of the input data; or platform specifications of a computing device used to render the three-dimensional model constructed from the input data.

In some examples, the three-dimensional model may be representative of a currently-existing physical object or structure, and include measurement data from a site of the currently-existing physical object or structure, and the measurement data may represent changes to one or more properties of the site over time.

In some examples, the currently-existing physical object or structure may be a data center facility.

In some examples, the instructions may further cause the one or more computing devices to perform the operations of: receiving, from an end user terminal, a request to interact with the three-dimensional model; loading the three-dimensional model into an application for three-dimensional model rendering; converting rendered data from the application into a streamable format; and streaming the converted data to the end user terminal.

In some examples, the request to interact with the three-dimensional model may be a request to manipulate the three-dimensional model, and the converted data may correspond to the three-dimensional model manipulated by the request.

In some examples, the request to interact with the three-dimensional model may identify a plurality of different stored models, and loading the three-dimensional model into the application may include loading each of the plurality of different stored models into the application for composite three-dimensional model rendering.

In some examples, the instructions may further cause the one or more computing devices to perform the operations of: receiving current data of one or more properties of a physical object or environment represented by the three-dimensional model; and providing the current data to the application for control of the three-dimensional model according to the current data.

In some examples, the current data may be received from a real-time data stream.

In some examples, the converted data may be a view of the three-dimensional model from a specified position at a specified angle, and streaming the converted data to the end user terminal may include associating the view of the three-dimensional model from the specified position at the specified angle with a URL.

In some examples, the instructions may further cause the one or more computing devices to perform the operations of: receiving a second request from a second request source that is either the end user terminal or a different end user terminal, the second request containing the URL; and streaming the converted data associated with the URL to the second request source.

In some examples, the application may be executed by the distributed computing environment, and loading the three-dimensional model into the application may include providing the three-dimensional model to the distributed computing environment.

Another aspect of the disclosure is directed to a method of managing a model, the method including: receiving, by one or more processors, three-dimensional model data representative of a setting; converting, by the one or more processors, the three-dimensional model data into a simplified model using a parallel processing pipeline architecture; rendering, by the one or more processors, the simplified model using a three-dimensional model rendering platform; converting, by the one or more processors, a view of the rendered model from a specific position at a specific angle, into a streamable format; and transmitting, by the one or more processors, the streamable format of the view of the rendered model to an end-user terminal over a network connection.

In some examples, the method may further include: receiving, by the one or more processors, an update to the three-dimensional model data; converting, by the one or more processors, the updated three-dimensional model data into an updated simplified model using the parallel processing pipeline architecture; replacing the simplified model with the updated simplified model; rendering, by the one or more processors, the updated simplified model using the three-dimensional model rendering platform; converting, by the one or more processors, a second view of the rendered updated model into the streamable format; and transmitting, by the one or more processors, the streamable format of the view of the rendered updated model to the end-user terminal over the network connection.

In some examples, transmitting the streamable format over the network connection may include transmitting the view of the rendered updated model to a web browser installed on the end-user terminal.

BRIEF DESCRIPTION OF THE DRAWINGS

FIGS. 5 and 6 are block diagrams of example routines in accordance with an aspect of the disclosure.

DETAILED DESCRIPTION

Overview

Figure 1:
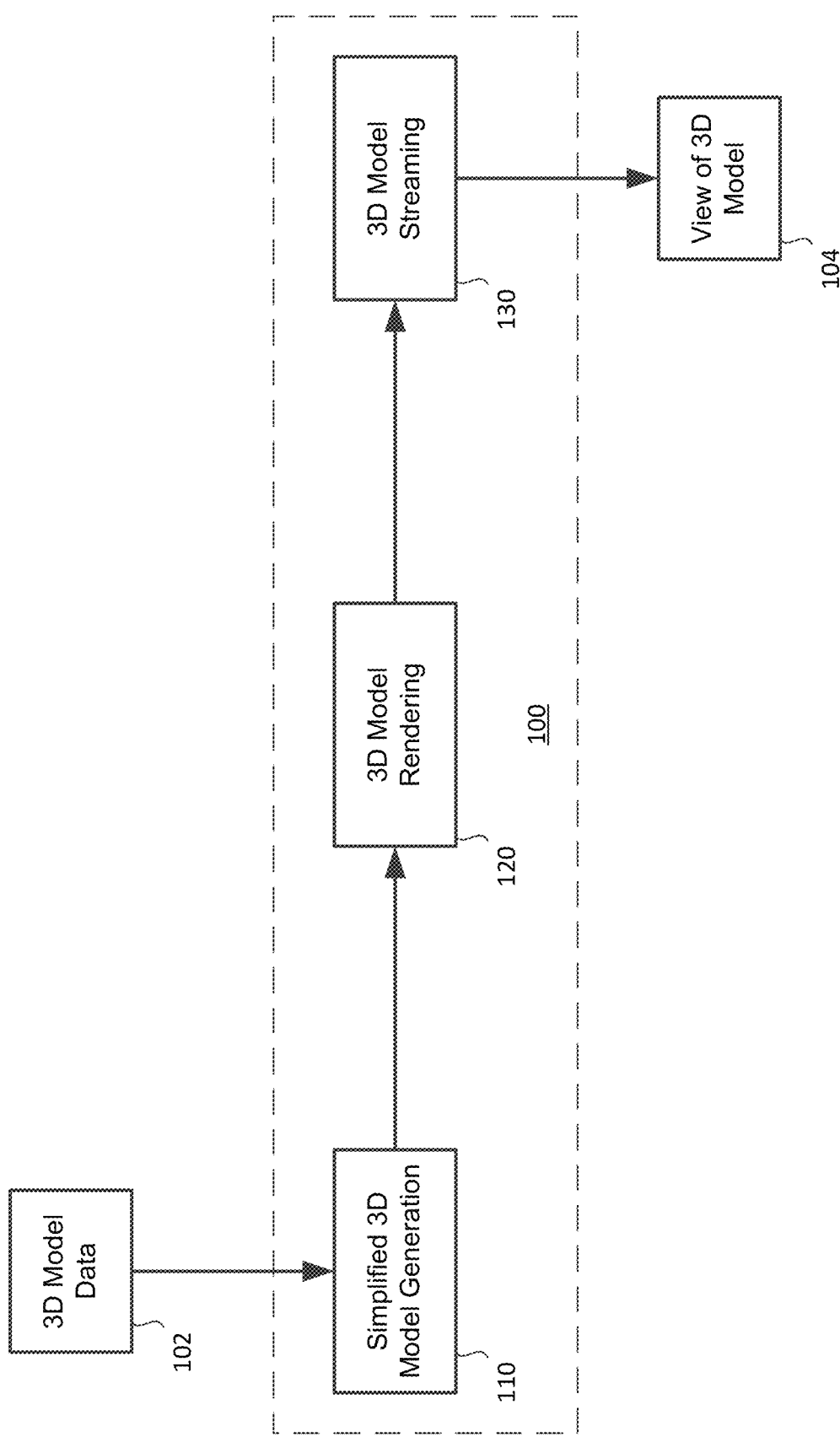
FIG. 1 is a block diagram of an example system in accordance with an aspect of the disclosure.

In a first stage of a system for interacting with large digital twins disclosed herein, the system receives and processes a 3D model including data representative of the physical object or space. The 3D model processing may involve converting the 3D model into a simplified format that can be rendered within the distributed computing environment. In order to accelerate the conversion process, the data may be divided into multiple portions, processed in parallel, and ultimately recombined. The system may support different modes of simplification based on the type of data being input for conversion. For instance, the raw data may include an indication of the data type being input, which may be used to configure the conversion process. Additionally or alternatively, the system may support different degrees of simplification which may be suitable for different respective 3D rendering platforms. For example, the input data may be converted to a lesser degree of simplification that is suitable for rendering at a supercomputer, and separately to a greater degree of simplification that is suitable for rendering at a local workstation.

In a second stage of the system, the converted 3D model is loaded onto a 3D rendering platform for processing. The platform may be based within the distributed computing environment in order to provide sufficient processing to perform rendering of the model. The rendered model may then be converted to another format that is suitable for streaming, such as a video file format. The converted data may then be streamed over a network to an end user terminal. Interaction between the end user terminal and the distributed computing environment may allow for the user to send instructions to the model to navigate within or interact with the model, whereby the streamed data returned to the user may show a series of frames depicting the user moving through or interacting with the model. The resources available within the distributed computing environment for processing the model allow for relatively fast processing of the user's instructions, making for a smooth user experience while navigating through or interacting with the model.

The models loaded into the rendering platform may include metadata, such as temperature information collected from the real-world environment. This metadata may be further incorporated, by the rendering platform, into the rendered model. Thus, when the user interacts with the model, this interaction may be dictated at least in part by the rules and constraints set out by the metadata of the virtual model. Furthermore, the rendering platform may be able to load and combine the model with additional information, such as one or more other models or real-time data of the real-world environment represented by the model. In such cases, the user experience may involve viewing or interacting with multiple models at once, with the models according to the real-time data at the corresponding physical environment, or both.

The rendered model may also be streamed to the user in a browser-friendly format. As such, a user may bookmark or share the data stream like any other webpage or webstream viewed on a browser. For instance, each data stream may be associated with a respective URL, and the URL can be copied from the user's browser and saved, shared with others, or both. Therefore, multiple users at different locations may experience the same views or interactions with the model, at the same time or at different times. Moreover, users may revisit particular locations and orientations in the model simply by entering a URL associated with that location and orientation.

The system of the present disclosure provides several benefits over conventional 3D modelling technologies. For example, views of and interactions with complex 3D models can be easily streamed from almost any end-user device, including but not limited to desktop computers, laptops, mobile devices, tablets, augmented reality (AR) devices, virtual reality (VR) devices, and so on. Furthermore, the complex 3D models can be digital twins of complex physical objects and environments, such as construction sites, security frameworks, data centers, warehouses, and may take in real-time data of the environments corresponding to the digital twins. Rendering and streaming can be conducted relatively quickly, making for a seamless user experience. Furthermore, updating model data and generating new simplified models for the rendering platform can be completed on the order of dozens of minutes, as opposed to taking hours or even days, meaning that users interacting with the model can have greater confidence that the model is an up-to-date representation of the corresponding environment.

Example Systems

FIG. 1 is a functional block diagram illustrating an example system 100. The system 100 is capable of receiving three-dimensional model data 102 as an input and delivering a view of a three-dimensional model 104 as an output. The three-dimensional model 104 may be a visual representation of the three-dimensional model data 102.

The three-dimensional model data 102 may be a virtual model of a physical object or space, within a virtual environment, which may model an actual existing object or space, or may be a planned or theoretical object or space that does not yet exist. The three-dimensional model data 102 may be constructed from inputs received from multiple sensors, such as any one or combination of images of the object or space, illustrations of the object or space, or other input data indicating properties of the object or space. In some examples, each of the images and illustrations may be two-dimensional but from a plurality of different angles so as to provide added dimensionality to the model. The three-dimensional model data 102 may be in a format used by three-dimensional design software programs and computer-aided design (CAD) programs, including but not limited to stereolithography format (STL), 3D object format (OBJ), filmbox format (FBX), digital asset exchange format (DAE), and so on.

In some examples, the three-dimensional model data 102 may represent a moving object such as a vehicle. In other examples, the data 102 may represent a stationary object, such as a building or other such structures, such as datacenters, hospitals, production facilities, factories, power plants, hotels, and so on. In other examples, the data 102 may represent a space larger than a single structure, such as a network of structures, underlying infrastructure between a network of structures, or both. Such examples may include data center campuses, healthcare networks, industrial environments, supply chain networks, transportation networks, solar farms, wind farms, power grids, and so on. The example objects and spaces may be currently existing objects and spaces or may be planned objects and spaces, such as prototypes or theoretical models for testing.

The physical object or space may exist, or be planned or projected to exist, in a particular environment. Data from the environment, such as temperature, humidity, traffic, and so on, may be gathered from the environment and integrated into the three-dimensional model data 102 in order to observe in the three-dimensional model 104 how the physical objects and spaces operate or perform within their environments. For instance, sensors of a vehicle, such as temperature sensors, noise sensors, pressure sensors and so on, may collect data regarding the activity of and within the vehicle, which in turn may be used to incorporate activity of and in the vehicle into the model. For further instance, for a structure, sensors may gather data from the surrounding environment. For further instance, for an operational network, input, output, traffic flow, data flow, and other operations parameters may be obtained from network-connected devices and integrated into the model. It should be recognized that the particular environmental data relevant to a given model may vary depending on the model, the environment, or both.

In the present disclosure, the three-dimensional model 104 may be a visual representation of the physical object or space. The three-dimensional model 104 may be configured using a format that can be viewed from the user device, such as a personal computer, laptop, tablet, smartphone or other network-connected device having a display. For instance, the format may be a streamable format, such as for streaming images or video over a web browser.

As shown in FIG. 1, the example system 100 may include several processing stages to turn the 3D model data 102 into a 3D model view that is viewable from a user device. The processing stages may include, but are not limited to, simplified 3D model generation 110 for processing the 3D model data into a simplified form, 3D model rendering 120 for rendering the simplified form of the 3D model data into a format suitable for viewing, and 3D model streaming 130 for converting the rendered 3D model data into a streamable format and streaming the converted data via a network connection to one or more user devices for viewing.

Each of the simplified 3D model generation 110, the 3D model rendering 120, and the 3D model streaming 130 may be performed using one or more computing devices of a distributed computing environment, such as a cloud computing environment. The cloud computing environment may include an assortment of physical machines, such as servers, processors, storage arrays, and so on. Computing capacity, storage capacity, or both, of the physical machines may be used to create virtual machine (VM) instances. The VM instances may be used to store and process data according to instructions, such as user requests received from user devices connected to the cloud computing environment via the network.

Figure 2:
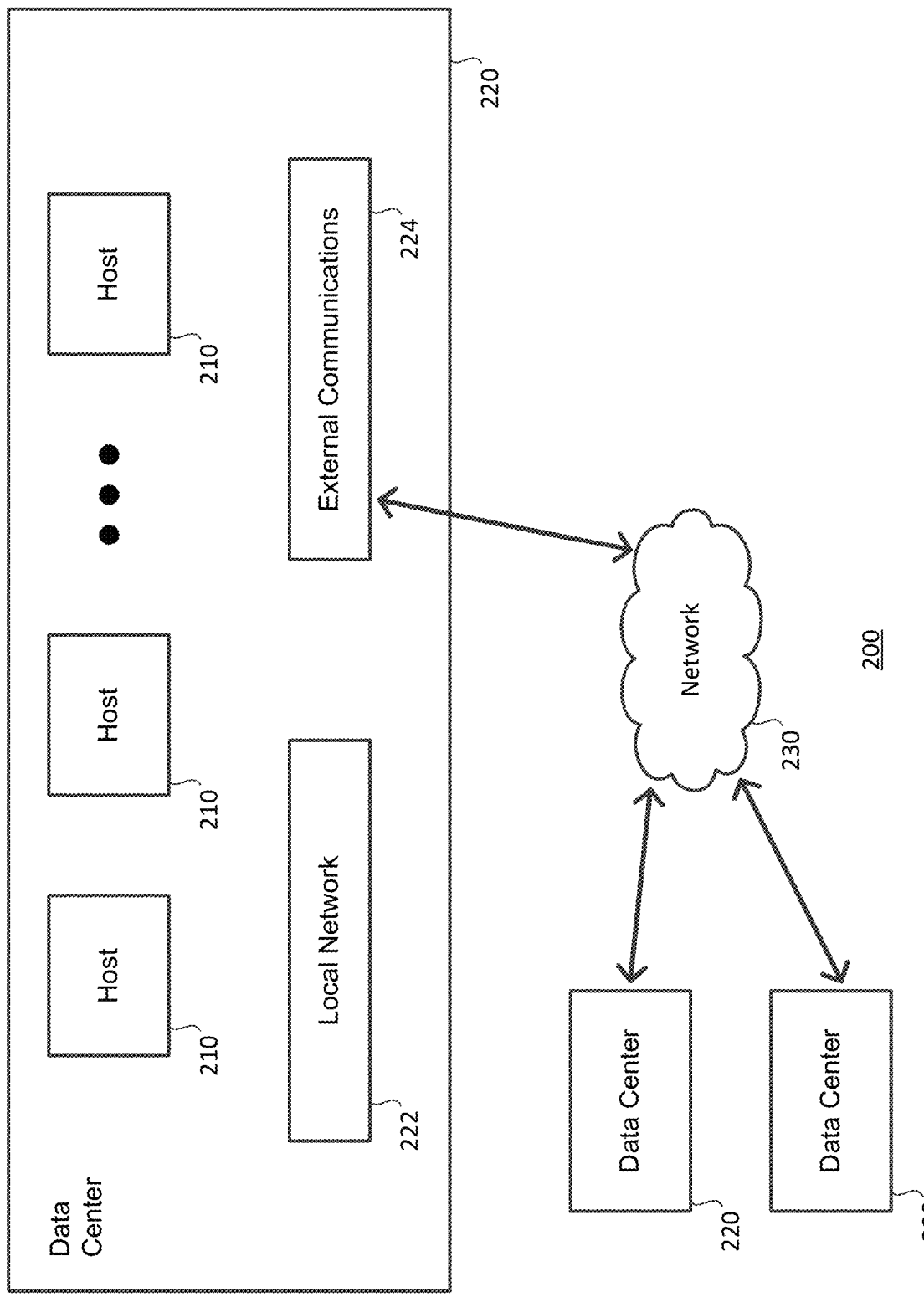
FIG. 2 is a block diagram of an example cloud computing system in accordance with an aspect of the disclosure.

One example of a cloud computing system is schematically depicted in FIG. 2. The system 200 includes a plurality of hosts 210 which may be physically present in a plurality of data centers 220 disposed in separate locations. Only a few data centers 220 and only a few of the hosts 210 in one of the data centers are depicted in FIG. 2; in practice, a typical data center may include hundreds or thousands of hosts. Each data center 220 typically includes a local network 222 and external communications 224 which allow communication between hosts in different data centers and with external computers over a network connection 230. The system typically includes shared resources such as storage hardware, for example, solid state disk drives and conventional disk storage.

Hosts 210 configurations may vary between different hardware and different kernels to provide different capabilities. Generally, each host 210 includes hardware elements such as a CPU, memory, and local storage such as solid state drives, graphics processing units or GPUs, a "host kernel" which enables the hardware to interact with one or more VMs. Multiple VMs may form a pod of VMs, which can leverage the processing capabilities of the GPUs. A GPU is a hardware element that includes multiple processing elements which operate in parallel. Typically, GPUs are configured to efficiently perform tasks that require massive parallel operations such as machine learning, pattern recognition, and so on. By linking a plurality of such computers together through a high-speed network using multiple network interfaces and using techniques such as remote direct memory access (RDMA) and CPU bypass which rapidly transfer data between different machines, the pod of VMs can leverage the GPUs to provide massive parallel computing capabilities. In some instances, the GPU-run pods facilitate supercomputer-type processing power, which enables customers for instance to run large-scale workloads and other supercomputing tasks, such as 3D model processing and simulation.

Figure 3:
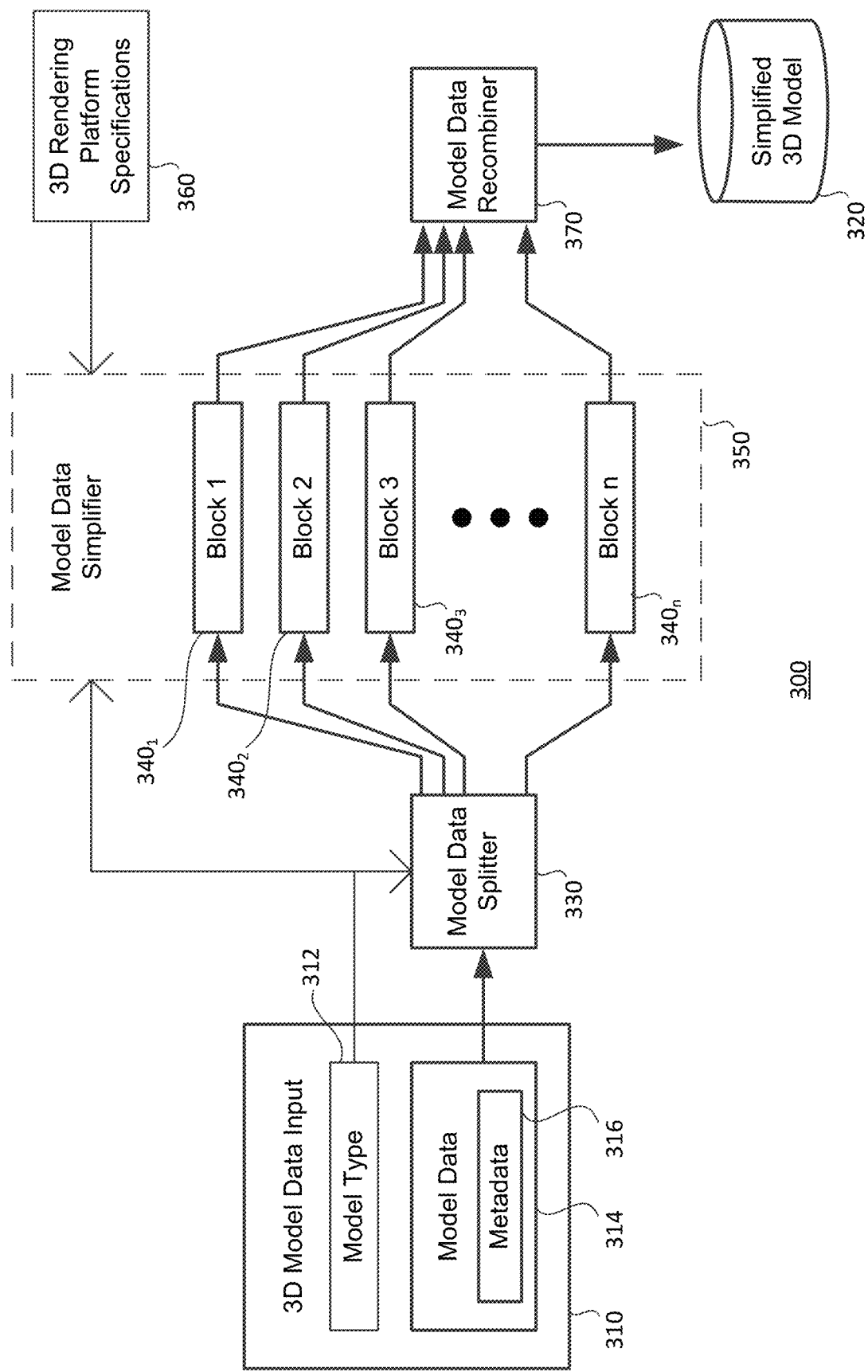
FIGS. 3 and 4 are block diagrams of an example data flow within the system of FIG. 1.

FIG. 3 is a block diagram illustrating an example data flow for the simplified 3D model generation 110 function of the system 100 of FIG. 1. In the example of FIG. 3, 3D model data 310 is received as an input, and a simplified 3D model 320 is generated as provided as an output to be stored in storage, such as storage of the cloud computing system or a remote storage location. The 3D model data input 310 may include information about the 3D model, such as a 3D model type 312, as well as the model data 314. The model data 314 may also include metadata 316, such as properties of different elements contained within the model data 314. For simulating physical objects, the properties indicated by the model metadata 316 may include any one or combination of object composition, mass, temperature, and so on. The model metadata 316 may be used, for instance, to simulate interactions with and between different elements of the 3D model.

The 3D model data input 310 may be provided to a model data splitter 330. The model data splitter 330 may be configured to divide the received model data 314 and metadata 316 into a plurality of blocks. In the example of FIG. 1, the model data is shown as divided into N separate blocks labeled $340_1$-$340_n$.

The model data may be split into the individual blocks $340_1$-$340_n$ in a manner that facilitates efficient processing of each individual block. Determining at which points the model data 310 is split into the individual blocks $340_1$-$340_n$ may be based on information about the model data 310 and instructions or rules. In some examples, the information about the model data 310 may include the model type 312 information. Additionally, multiple instructions or rules for splitting data may be prestored in the system, and different instructions and rules may correspond to different model types. For example, one set of rules may be used to divide a model of a building into blocks, and a different set of rules may be used to divide a model of a supply chain into blocks. In another example, one set of rules may be used to divide a model of a hospital into blocks, and a different set of rules may be used to divide a model of a data center into blocks.

Additionally or alternatively, the information about the model data 310 used to determine at which points the model data 310 is split may include spatial information about spatial positioning of elements included within the model. Such information may be used to divide the model data 310 into spatial blocks corresponding to respective given volumes of the physical object or space, whereby elements of a given spatial block occupy a particular volume associated with the spatial block. In some examples, a given volume may represent a contiguous volume of space of the simulation generated according to the data. In other examples, the given volume may span multiple non-contiguous spaces of the simulation, but it may be advantageous for the elements of those separate spaces to be processed together. For example, if a model includes multiple elements having one or more of the same or similar properties, then it may be advantageous to group those elements together in a single block for processing.

The individual blocks $340_1$-$340_n$ generated by the model data splitter may be handled by the system as separate workloads, and provided to a model data simplifier 350 for processing as separate workloads. The model data simplifier 350 may be a parallel processing architecture capable of processing each of the block workloads in parallel to one another.

For each given model data block, simplification of the model data included in the block may involve reducing the size of the model data block. The size reduction may involve either one or both of lossy and lossless reduction techniques. Lossy techniques may identify certain elements of the data or properties of the elements that are not necessary or of lower priority for running and viewing the model, and may either simplify or even delete those elements from the data block. For example, the resolution of an element or the properties of the element may be reduced. Reducing resolution of an element may be performed spatially, such as reducing the number of voxels per unit of length of the element within the model. Additionally or alternatively, reducing resolution may involve simplifying the amount of detail about the element, such as reducing the significant figures of a property of the element, or grouping any number of individual elements into a single element, such as combining a row of three block-shaped elements into a single rectangular element. Lossless techniques may identify redundancies in the model data and simplify processing of the data by grouping the redundant data together.

Simplification of the model data 314 may be based on the model data 314 itself and one or more additional factors. For instance, a model type 312 of the model data 314 may be used in order to guide the simplification process. This may be useful for forms of model data that may be included in multiple types of models, but for which a preferred way of simplifying that model data may vary depending on the particular type of model to which the data belongs. For example, two different models of buildings may include similar architectural elements, but one type of building may be used for temperature-sensitive operations while another type of building may be used for other operations that are not temperature-sensitive. In such a scenario, it may be possible to simplify temperature-related properties of the architectural elements, such as heat capacity and insulative properties, for the model related to temperature-independent operations to a greater degree than for the model related to temperature-sensitive operations. Simplification of other forms of data based on model type may follow the same or similar rules or guidelines.

Another factor that may be used to simplify the model data 314 may be one or more specifications of the 3D rendering platform 360 that is expected to be used to render the simplified model data. For example, 3D rendering platforms each have a particular computing capacity. Those 3D rendering platforms that have a greater amount of computing capacity may be capable of rendering larger 3D models than those 3D rendering platforms with less computing capacity. Therefore, the desired degree of simplification may vary depending on the rendering platform that is expected to be used for processing the simplified model data.

Upon simplification of the individual blocks $340_1$-$340_n$, the simplified model data from the blocks may be recombined by a model data recombiner 370 in order to form the simplified 3D model 320. As shown in FIG. 3, the simplified 3D model 320 may be transferred to storage so that it can be accessed at a future time by one or more 3D rendering platforms.

The example of FIG. 3 shows model data 314 being split and simplified a single time into a single simplified 3D model 320. However, in many examples, it may be expected that the model data will be processed at multiple different types of rendering platforms. Therefore, the same model data 314 may be processed by the model data simplifier 350 multiple times in order to derive multiple simplified 3D models 320, whereby each simplification process may apply a different degree of simplification to the model data 314 so that the resultant simplified 3D models 320 are of different sizes. This may allow any given 3D rendering platform to select the appropriate size 3D model for rendering based on the platform's capabilities and available resources.

Figure 4:
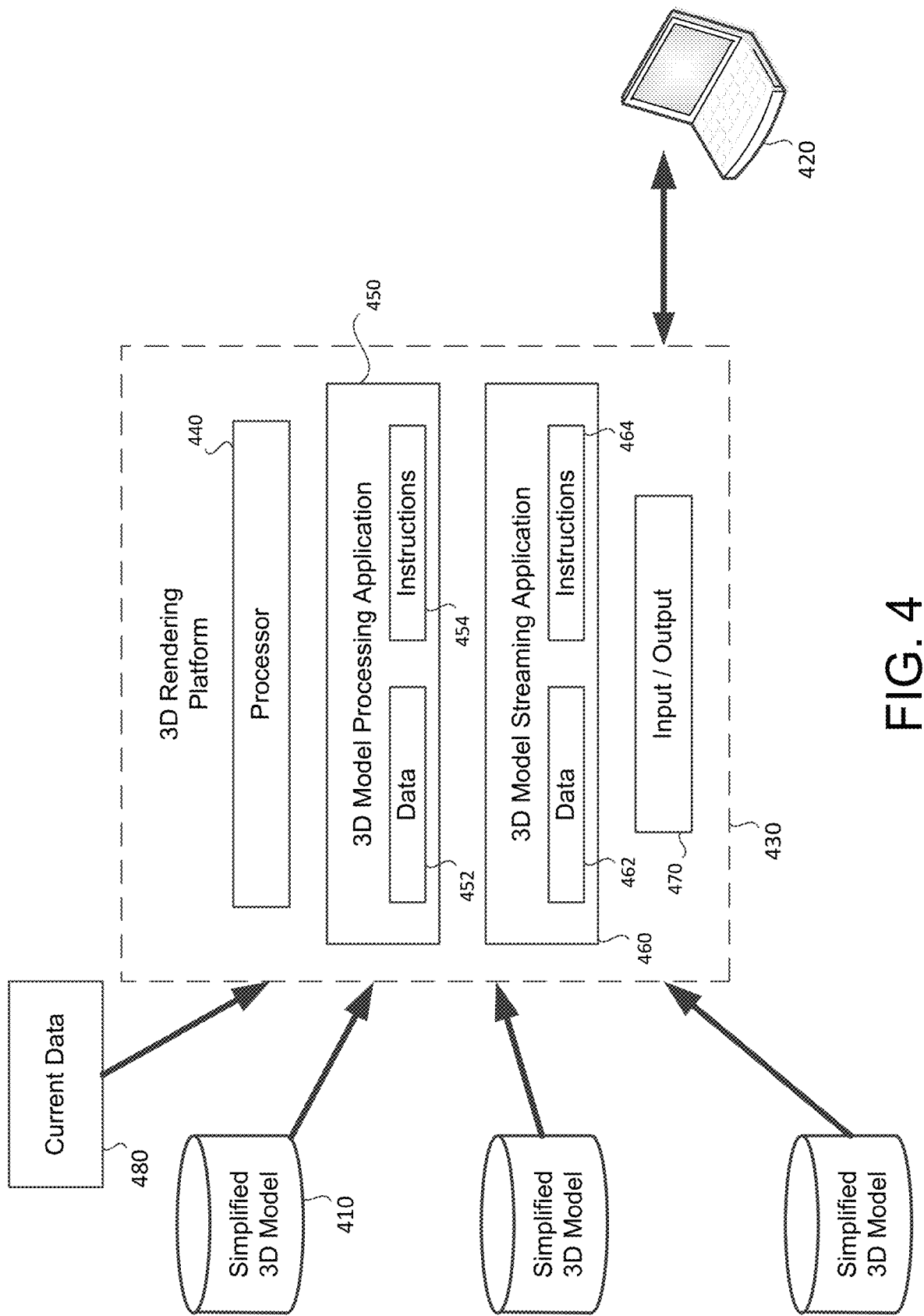

FIG. 4 is a block diagram illustrating an example data flow for simplified 3D model processing, which may include both the 3D model rendering 120 and 3D model streaming 130 functions of the system 100 of FIG. 1. In the example of FIG. 4, one or more simplified 3D models 410 are received as an input at a 3D rendering platform 430, and a datastream of the rendered one or more 3D models is provided as an output from the 3D rendering platform 430 to be viewed by one or more network-connected user devices 420. Each simplified 3D model 410 may include both model data and metadata as described in connection with FIG. 3.

The 3D rendering platform 430 may utilize the computing and storage devices of the distributed computing environment. As shown in FIG. 4, the 3D rendering platform may include one or more processors 440 for processing the simplified 3D models 410 coupled with one or more memory or storage devices for storing instructions and data for controlling operations of the one or more processors 440. The processors 440 may be any logic circuitry that processes instructions, including but not limited to instructions fetched from the memory or cache. For instance, the processors 440 may include microprocessor units or special purpose processors, may include single-core or multi-core processors, may be configured to run multi-threaded operations, and may host one or more virtual machines or containers, along with a hypervisor or container manager for managing the operation of the virtual machines or containers, and so on. The memory may be any device suitable for logically addressing and storing computer readable data, and may be implemented using flash memory devices, such as for example NAND flash memory devices, or other types of non-volatile memory devices. In certain implementations, volatile memory devices such as random access memory devices, as well as other types of memory, may be used. For example, memory may support virtualized or containerized memory accessible by virtual machine or container execution environments. Additionally, any number of memory devices may be included.

As shown in FIG. 4, the memory may include data 452 and instructions 454 for executing a 3D model processing application 450, and data 462 and instructions 464 for executing a 3D model streaming application 460.

The 3D model processing application 450 may be configured to receive and load 3D model data from storage, and render the 3D model data according to the stored instructions 454. The 3D model data may be simplified 3D models. Also, in some examples, the 3D model processing application 450 may receive and load multiple models and render the multiple models together with one another. In some examples, the multiple models may include 3D models. Additionally or alternatively, the one or more models may include two-dimensional models representative of one or more subsystems included in the represented physical object or environment, such as satellite data of the object or environment, or a mapping of a two-dimensional system such as sewer lines. This may result in composite 3D model rendering, whereby separate portions of a larger 3D model may be developed, uploaded to, and stored in the system separately, and then combined together with one another at the rendering phase.

Additionally or alternatively, the 3D model processing application 450 may receive current data 480 indicating one or more properties of the physical object or environment represented by the 3D model. The properties may be measured by sensors and other instruments located at the site of the physical object or environment to accurately reflect the 3D model's corresponding environment. Example properties may include but are not limited to, temperature, humidity, traffic, and so on. The current data 480 may be gathered on a real-time basis, meaning that the received data reflects properties of the corresponding environment at a current or relatively recent time and is refreshed regularly enough to impact the 3D model in a manner that reflects impacts to the physical object or environment. For example, the current data 480 may be received via the network over a data feed, such as intermittent or regular data communications or a real-time data stream. Data communications of current data 480 may be transmitted manually by personnel collecting the data measurements, collected and communications automatically by one or more sensors, or any combination thereof. Since the current data 480 is capable of impacting other elements included in the 3D model, including the current data 480 may control the rendering of the 3D model by impacting an appearance or operation of the rendered model.

The 3D model streaming application 460 may be configured to convert the rendered data from the 3D model processing application 450 into a streamable format and then transmit the converted data stream over the network to the user device 420. The streamable format may be a format suitable for viewing at the user device 420 in a web browser installed thereon. For instance, the streamable format may be a video format or image format, whereby a stream of images or video images may be provided to the user device to provide a view or a moving series of views of the 3D model from a certain viewpoint or perspective. For example, the system may receive a request from the user device 420 to view the rendered 3D model from a location within the 3D model specified by the request, and in the direction of a particular angle specified by the request. In response to the user request, the 3D model streaming application 460 may access the rendered 3D model and generate the requested view from the specified location at the specified angle in the streamable format. The requested view in the streamable format may then be transmitted to the user device 420 over the network in order to be viewed at the user device 420.

Input/output communication devices 470 may be included to facilitate communication between the 3D rendering platform 430 and other systems or devices that are in communication with the platform, such as the user device 420. The communication devices 470 may be capable of transmitting data to and from other computers such as modems (e.g., dial-up, cable or fiber optic) and wireless interfaces.

The user device 420 may be configured with a processor, memory, instructions, and data. For example, the user device may be a personal computer, intended for use by a person having all the internal components normally found in a personal computer such as a central processing unit (CPU), an optional display device (for example, a monitor having a screen, a projector, a touch-screen, a small LCD screen, a television, or another device such as an electrical device that can be operable to display information processed by the processor), CD-ROM, hard drive, user input (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise devices capable of processing instructions and transmitting data to and from humans and other computers including general purpose computers, PDAs, network computers lacking local storage capability, set top boxes for televisions, and other networked devices. The user device may include mobile devices capable of wirelessly exchanging data over a network such as the Internet. By way of example only, the user device may be a wireless-enabled PDA, tablet PC, or a cellular phone capable of sending information via the Internet. The user may input information, for example, using a small keyboard, a keypad, or a touch screen.

While only a single user device is shown in FIG. 4, it should be understood that multiple user devices belonging to one or more users may be connected to the 3D rendering platform 430 via the network. Network connections between user devices and the 3D rendering platform 430 may include various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

In operation, interaction between the user device 420 and the 3D rendering platform 430 over the network may be continuous while the user device 420 is viewing the model. For instance, a stream of user requests may be transmitted from the user device 420 over the network to the 3D rendering platform 430 indicating the user's viewing and manipulation of the 3D model, such as navigation through the space of the 3D model. In response, a data stream may be provided from the 3D rendering platform 430 back to the user device 420 that projects a view of the 3D model as navigated by the user. One advantage of conducting interaction between the 3D rendering platform 430 and the user device 420 using a streamable format is that any given view provided by the 3D rendering platform 430 may be associated with a uniform resource locator (URL). This allows the same view to be replicated from any device simply by providing the same URL as the user request.

Example Methods

FIG. 5 is a block diagram illustrating an example routine 500 performed by a system for digital twin management and interaction such as the example system 100 of FIG. 1. The example routine 500 may be executed using one or more processors of the distributed computing architecture.

At block 510, the one or more processors may receive three-dimensional model data. The data may be related to a digital twin of an object or space that either currently exists or is planned or projected to exist, such as a prototype or working concept. In this sense, the digital twin may be representative of a real-world setting that either does exist or could possibly exist.

At block 520, the one or more processors may convert the three-dimensional model data into a simplified three-dimensional model. This may be performed by dividing the data of the three-dimensional model into a plurality of blocks, and treating each block as a separate independent workload for which the data contained in the block is to be simplified. The size of each block may vary from one system to another. Models with larger blocks may take more time to process each individual block, but may take less time to perform the dividing operations and subsequent recombining operations described herein. One factor for choosing the block size of a given model may be the complexity density of the model, whereby more complex models may require smaller blocks to ensure that individual blocks are processed within a reasonable amount of time, and less complex models may permit larger blocks to improve processing times for splitting and recombining.

Simplification can be performed using a parallel processing pipeline architecture, whereby each independent block of data may be processed in parallel with the other blocks, thereby resulting in an increased processing efficiency for the system. Additionally, the parallel processing pipeline architecture allows for conversion of an uploaded three-dimensional model to be completed in the order of minutes instead of hours or days, even for complex models. For example, simplification of complex models may take about 12 minutes to about 60 minutes. Furthermore, since simplification is performed in parallel, the three-dimensional model may be simplified to various degrees of simplification at the same time, meaning that in the same order of minutes, multiple simplified versions of the model data can be produced by the system.

At block 530, the one or more processors may render the simplified model using a three-dimensional model rendering platform. The three-dimensional model rendering platform may also be included within the distributed computing architecture used for the simplification process. However, the particular machines responsible for simplification may be different than the machines responsible for rendering. The rendering may be performed on-demand, such as in response to a user request to view the three-dimensional model. Additionally, on-demand requests may specify a combination of stored models Although not shown in FIG. 5, the simplified three-dimension model may further be stored in a storage device included in or in communication with the distributed computing architecture between blocks 520 and 530. Thus, the simplification at block 520 and the rendering at block 530 may be carried out at separate times with any amount of time in between. In this manner, simplification can be performed, or scheduled to be performed, in advance, such as automatically upon receiving the model data. Furthermore, simplification of the model data into the multiple degrees of simplification can all be done in advance, regardless of what user requests have or have not yet been received. Requests for different levels of simplification can then be fulfilled upon receipt based on the simplified three-dimensional models that are generated in advance.

At block 540, the one or more processors may convert the rendered three-dimensional model into a streamable format. The streamable format may be in the form of a streamable image or video, whereby the three-dimensional model is seen in the image or video from a specific position or location looking in a specific direction or angle. At block 550, the converted image or video of the three-dimensional model may be transmitted by the one or more processors over a network connection to one or more destination locations. Destination locations may include user devices or other end-user terminals that are communicatively connected to the system. In this manner, the streamable images or video may be viewed through a standard web browser at a user device without requiring specialized software or processors for viewing the three-dimensional model at the user device.

One of the advantages of the method of routine 500 is the ability to simplify the three-dimensional model data in a significantly reduced timeframe compared to conventional methods. This makes it feasible for changes to be made to a digital twin, and for the changed digital twin to be uploaded, simplified and rendered within a reasonable amount of time, such as less than one hour, or in some cases in less than a half-hour, and in some cases even in less than a quarter-hour. This means that numerous iterations of a digital twin can be created and tested all within a few hours, whereas with conventional methods the process would have allowed much fewer iterations to be generated and tested within a longer amount of time.

FIG. 6 is a block diagram illustrating another example routine 600 in which three-dimensional model data is updated. The routine 600 may be performed by the same or similar processors as routine 500 of FIG. 5. At block 610, the one or more processors may receive an update to three-dimensional model data for one of the three-dimensional models stored in the system. The updated data may indicate one or more changes to a previously stored three-dimensional model from which simplified three-dimensional models may have been generated. At block 620, the one or more processors may convert the updated three-dimensional model data into an updated simplified three-dimensional model. The updating process may be comparable to the process described in connection with block 520 of routine 500, whereby the updated model data is divided into blocks and simplified using the parallel processing pipeline architecture, and then recombined after simplification. Also, the simplified model data may be stored for later use, and multiple simplifications at varying levels of simplification can be generated. Optionally, at block 630, previously stored simplified model data may be replaced with the updated simplified model data. Replacement may involve deleting or archiving the previously stored simplified model data, and in some cases may conserve storage space. Once the simplified model data is replaced with the updated simplified model data, operations may continue at block 530 of FIG. 5 with rendering of the updated simplified model data using the same underlying principles as described in connection with routine 500 and the present disclosure.

The methods and systems of the present disclosure allow for very large three-dimensional models to be rendered and streamed to even a conventional computing device in only a matter of seconds requiring only a web interface such as a browser at the user device end. computing device Furthermore, navigation through the three-dimensional model from the conventional computing device can be performed without breaks or interruptions in the streaming process, giving the three-dimensional model a realistic feeling to the navigator. In addition to the realism of the navigation process, the ability to incorporate current data into the rendered three-dimensional model can provide a further element of realism to the navigation experience, since properties and conditions of the navigated environment or space can reflect actual conditions of a corresponding real environment. Additionally, the ability to update model data multiple times within even a single hour allows for greater assurance that testing is being performed on a most recent iteration of a three-dimensional model and not on an outdated version. Additionally, the use of a web interface to navigate the rendered three-dimensional model allows for URLs of views of the three-dimensional model to be easily shared or bookmarked so that views can be easily replicated between devices and revisited at the same or another device at another time.

Altogether, the methods and systems of the present disclosure can provide significant advantages managing projects using digital twins, whether by providing more up-to-date models on a more regular basis, or by allowing the models to be shared across conventional devices without requiring specialized equipment or processing, or by allowing views of the models to be efficiently shared using URLs. This can lead to more efficient digital twin project management and a better user experience using digital twin technology.

While the above examples generally describe the use of the present technology for digital twins of existing, planned or projected objects and spaces, it should be recognized that many of the same or similar concepts may be applied to any model, even if there is no expectation of it existing in a real-world space. For example, a fictional setting could be modeled, rendered and navigated using the techniques of the present disclosure. Even in the example of a fictional setting, the fictional setting could receive current data, which could be taken from a real-world setting, randomly generated, a combination of both, such as generated based on a function applied to data collected from a real-world setting.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as

The invention claimed is:

1. A system comprising:
one or more computing devices; and
memory storing instructions that, when executed, cause the one or more computing devices to perform the operations of:
receiving input data for constructing a three-dimensional model;
dividing the input data into a plurality of workloads;
providing the plurality of workloads to a parallel processing architecture of a distributed computing environment;
instructing the parallel processing architecture to simplify the input data according to a specified degree of simplification selected from a plurality of different degrees of simplification;
receiving the processed workloads from the parallel processing architecture, wherein the parallel processing architecture is configured to convert the input data to a simplified format for construction of a simplified version of the three-dimensional model according to the specified degree of simplification;
combining the processed workloads into the simplified version of the three-dimensional model; and
storing the simplified version of the three-dimensional model in the distributed computing environment.

2. The system of claim 1, wherein the input data includes metadata, and wherein at least some of the metadata is preserved in the three-dimensional model.

3. The system of claim 1, wherein the input data includes an indication of a model attribute, and wherein dividing the input data into a plurality of workloads is based on the model attribute.

4. The system of claim 1, wherein dividing the input data into a plurality of workloads comprises:
dividing a physical object or environment represented by the input data into a plurality of spatial blocks, each spatial block corresponding to a volume of space of the physical object or environment;
sorting the input data among the plurality of spatial blocks; and
assigning the plurality of spatial blocks to the plurality of workloads.

5. The system of claim 1, wherein dividing the input data into a plurality of workloads comprises:
dividing a physical object or environment represented by the input data into a plurality of categories, each category corresponding to a different feature of the physical object or environment;
sorting the input data among the plurality of categories; and
assigning the plurality of spatial blocks to the plurality of workloads.

6. The system of claim 1, wherein the instructions further cause the one or more computing devices to perform the operation of: determining the specified degree of simplification based on at least one of: a model attribute of the input data; or platform specifications of a computing device used to render the three-dimensional model constructed from the input data.

7. The system of claim 1, wherein the three-dimensional model is representative of a currently-existing physical object or structure, and includes measurement data from a site of the currently-existing physical object or structure, wherein the measurement data represents changes to one or more properties of the site over time.

8. The system of claim 7, wherein the currently-existing physical object or structure is a data center facility.

9. The system of claim 1, wherein the instructions further cause the one or more computing devices to perform the operations of:
receiving, from an end user terminal, a request to interact with the three-dimensional model;
loading the three-dimensional model into an application for three-dimensional model rendering;
converting rendered data from the application into a streamable format; and
streaming the converted data to the end user terminal.

10. The system of claim 9, wherein the request to interact with the three-dimensional model identifies a plurality of different stored models, and wherein loading the three-dimensional model into the application comprises loading each of the plurality of different stored models into the application for composite three-dimensional model rendering.

11. The system of claim 9, wherein the instructions further cause the one or more computing devices to perform the operations of:
receiving current data of one or more properties of a physical object or environment represented by the three-dimensional model; and
providing the current data to the application for control of the three-dimensional model according to the current data.

12. The system of claim 11, wherein the current data is received from a real-time data stream.

13. The system of claim 9, wherein the converted data is a view of the three-dimensional model from a specified position at a specified angle, and wherein streaming the converted data to the end user terminal comprises associating the view of the three-dimensional model from the specified position at the specified angle with a URL.

14. The system of claim 13, wherein the instructions further cause the one or more computing devices to perform the operations of:
receiving a second request from a second request source that is either the end user terminal or a different end user terminal, the second request containing the URL; and
streaming the converted data associated with the URL to the second request source.

15. The system of claim 9, wherein the application is executed by the distributed computing environment, and wherein loading the three-dimensional model into the application comprises providing the three-dimensional model to the distributed computing environment.

16. A system comprising:
one or more computing devices; and
memory storing instructions that, when executed, cause the one or more computing devices to perform the operations of:
receiving input data for constructing a three-dimensional model;
dividing the input data into a plurality of workloads;

providing the plurality of workloads to a parallel processing architecture of a distributed computing environment;
receiving the processed workloads from the parallel processing architecture;
combining the processed workloads into the three-dimensional model;
storing the three-dimensional model in the distributed computing environment;
receiving, from an end user terminal, a request to interact with the three-dimensional model, wherein the request to interact with the three-dimensional model is a request to manipulate the three-dimensional model;
loading the three-dimensional model into an application for three-dimensional model rendering;
converting rendered data from the application into a streamable format, wherein the converted data corresponds to the three-dimensional model manipulated by the request; and
streaming the converted data to the end user terminal.

17. A method comprising:
receiving, by one or more processors, input data for constructing a three-dimensional model;
dividing, by the one or more processors, the input data into a plurality of workloads;
providing, by the one or more processors, the plurality of workloads to a parallel processing architecture of a distributed computing environment;
instructing the parallel processing architecture to simplify the input data according to a specified degree of simplification selected from a plurality of different degrees of simplification;
receiving, by the one or more processors, the processed workloads from the parallel processing architecture, wherein the parallel processing architecture is configured to convert the input data to a simplified format for construction of a simplified version of the three-dimensional model according to the specified degree of simplification;
combining, by the one or more processors, the processed workloads into the simplified version of the three-dimensional model; and
storing, by the one or more processors, the simplified version of the three-dimensional model in the distributed computing environment.

18. The method of claim 17, further comprising:
determining, by the one or more processors, the degree of simplification based on at least one of: a model attribute of the input data; or platform specifications of a computing device used to render the three-dimensional model constructed from the input data.

19. The method of claim 17, further comprising:
receiving, by one or more processors, from an end user terminal, a request to interact with the three-dimensional model;
loading, by one or more processors, the three-dimensional model into an application for three-dimensional model rendering;
converting, by one or more processors, rendered data from the application into a streamable format; and
streaming, by one or more processors, the converted data to the end user terminal.

* * * * *